July 16, 1929. 1,720,872
O. ZERK, NOW BY JUDICIAL CHANGE OF NAME O. U. ZERK
LUBRICANT DISPENSING APPARATUS
Filed July 5, 1923  2 Sheets-Sheet 1
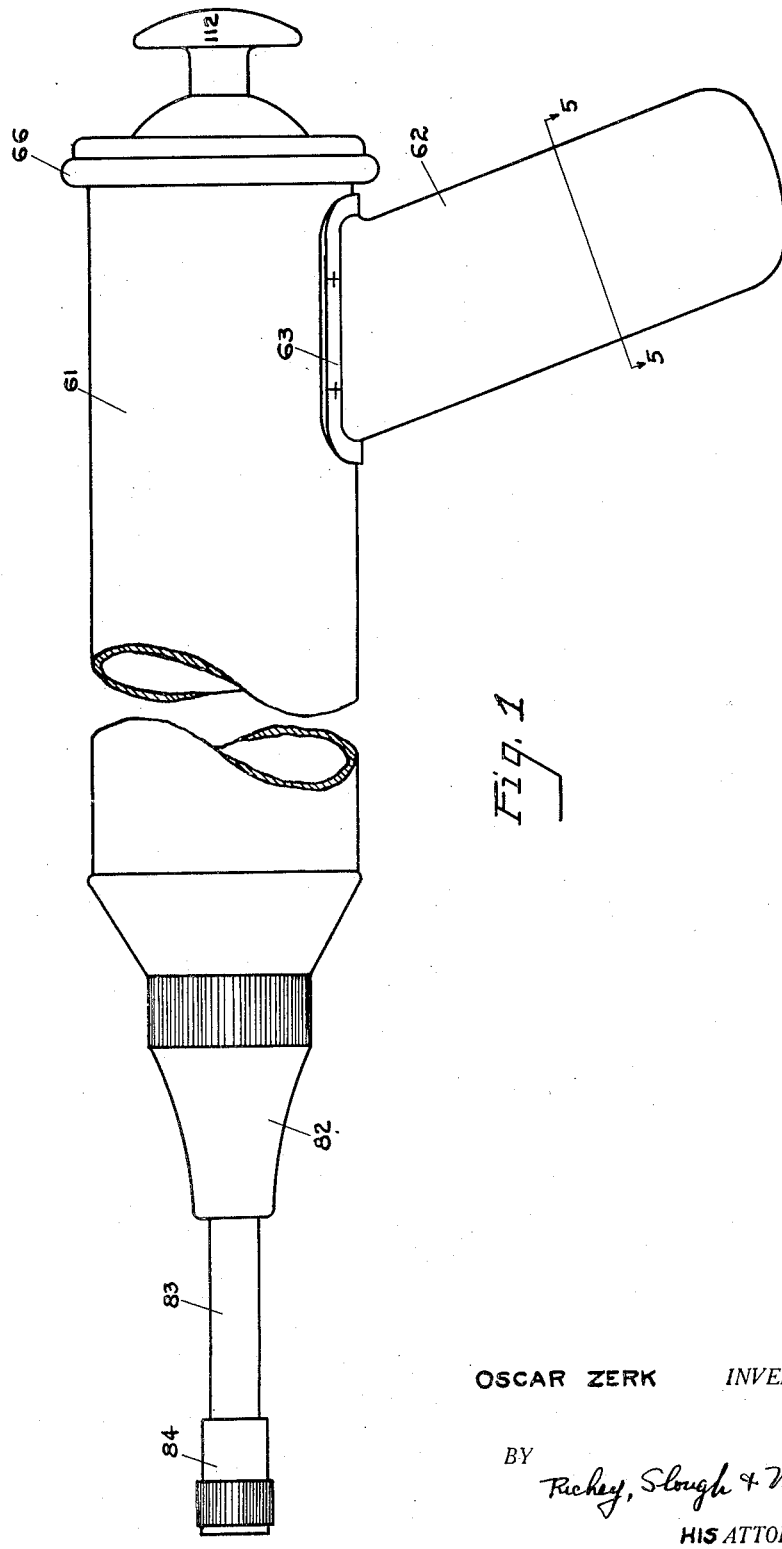
OSCAR ZERK  INVENTOR.
BY
Richey, Slough & Watts.
HIS ATTORNEYS July 16, 1929.　　　　　　　　　　　　　　　1,720,872
O. ZERK, NOW BY JUDICIAL CHANGE OF NAME O. U. ZERK
LUBRICANT DISPENSING APPARATUS
Filed July 5, 1923　　　2 Sheets-Sheet 2
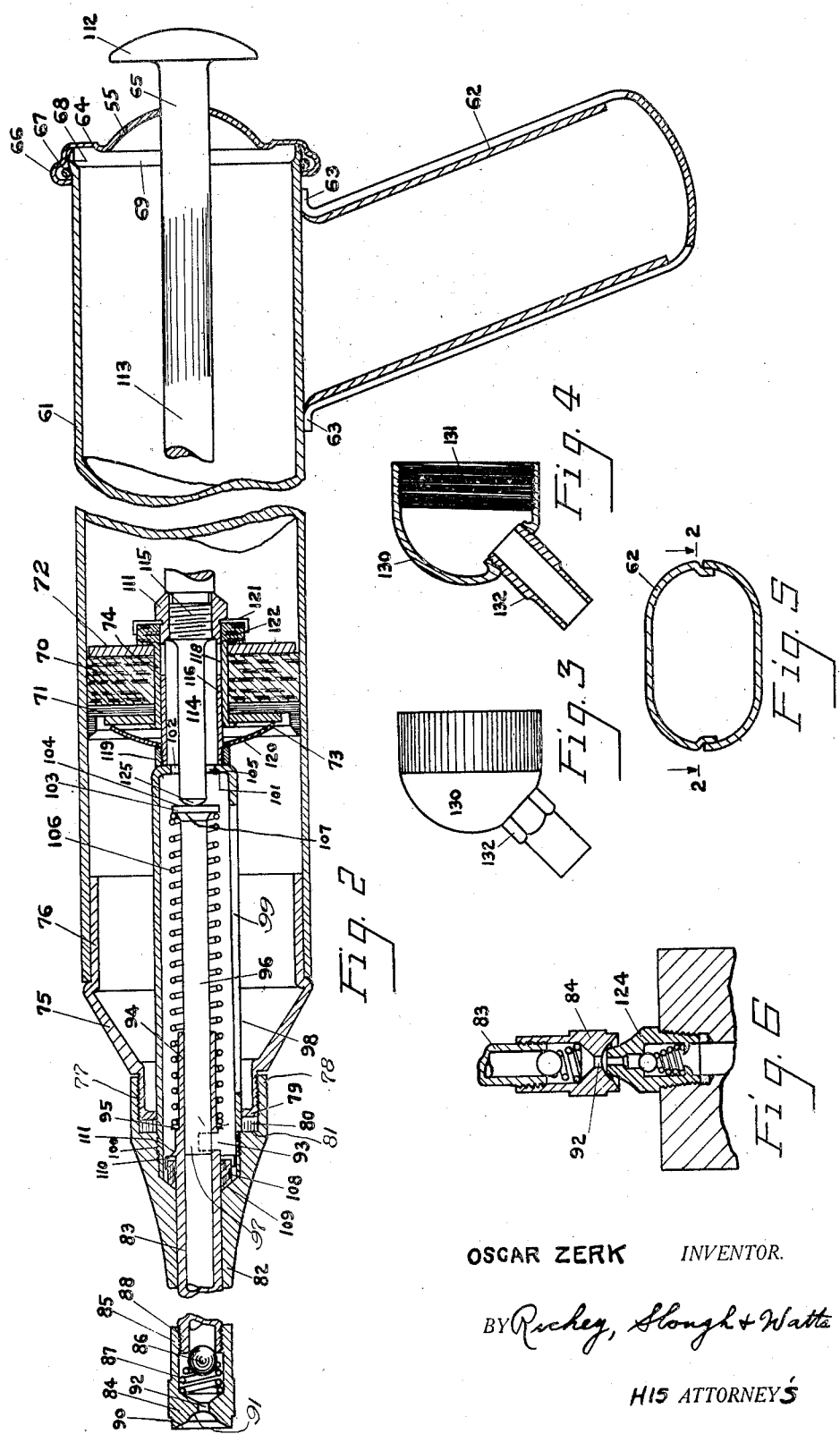
OSCAR ZERK　　INVENTOR.
BY Richey, Slough & Watts
HIS ATTORNEYS Patented July 16, 1929.

1,720,872

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO ALEMITE MANUFACTURING CORPORATION, OF CHICAGO, ILLINOIS, A CORPORATION OF DELAWARE.

LUBRICANT-DISPENSING APPARATUS.

Application filed July 5, 1923. Serial No. 649,705.

My invention relates to lubricant dispensing devices and more particularly to lubricant compressors employed in connection with lubricant receiving nipples affixed to the parts to be lubricated.

An object of my invention is to provide a lubricant compressor comprising a reservoir from which lubricant is forcibly ejected at a very high pressure into a bearing nipple and to further provide a compressor so constructed that at successive operations thereof air will be excluded from the lubricant, thereby avoiding intermittent, faulty operation of the compressor and failure to discharge lubricant properly at high pressure.

Another object is to provide a lubricant compressor wherein the discharge conduit is automatically closed at its inlet end whenever the supply of lubricant within the reservoir has been depleted to a predetermined degree.

Another object is to provide a refilling means for the high pressure ejecting means which is normally actuated automatically by the suction of said ejecting means but which may be positively actuated to prime the ejecting means in case the latter should become air bound or require priming for any other reason.

Another object is to provide a highly efficient device of the above character which may be manufactured at a relatively low cost.

Another object is to provide a unitary assembled nozzle structure which may be removed as a unit and replaced by a nozzle of different character.

Another object is to provide a lubricant compressor capable of being operated to discharge a large quantity of lubricant at a lower pressure through a special nozzle provided for this purpose whenever it is desired to do this as when filling the universal joint casings of an automobile transmission.

Other objects of my invention and the invention itself will be apparent by referring to the specification of my invention comprising the drawings and description in which reference is made to the specific embodiment of my invention illustrated in the drawings.

Referring to the drawings in which a preferred embodiment of my invention is illustrated:

Figure 1 shows a side elevation of my improved lubricant gun or compressor;

Figure 2 shows a longitudinal section thereof;

Figure 3 shows a side elevation of a modified form of nozzle;

Figure 4 is a longitudinal section of the nozzle shown in Figure 3;

Figure 5 is a section on the line 5—5 of Figure 1; and

Figure 6 is a longitudinal section showing the nozzle of the compressor in contact with a bearing nipple.

The cylindrical compressor barrel 61 has a handle 62 which is rigidly secured thereto at 63, by electric welding or in any other suitable manner. The handle is preferably made of sheet metal and has considerable rigidity.

At one end of the barrel I provide a cover cap 64 perforated at 65 and having its rim 66 folded over to embrace a ring of spring wire 67. The end of the barrel 61 over which the rim of the cap 64 is to be fitted is flared outwardly as shown at 68, the flared portion being rounded so that the spring wire will snap over the portion thereof of greatest diameter and retain the cap by spring pressure in close, dust-proof contact with the edge 69 of the barrel. A piston positioned within the barrel comprises the cork element 70 and cup leather 71, the two being clamped together between metal washers 72 and 73 by a hollow rivet 74, the ends of which are flared over the outer edge of the opening provided in the washers.

At the other end of the barrel 61, remote from the cover 64, is secured a head 75, the barrel being fitted over a cylindrical portion 76 of the head 75, the joint being what is known as a pressed fit and sufficiently tight to be leak-proof even at relatively high lubricant pressures. Screwthreaded as shown at 77 onto the head 75, is a nozzle and pump supporting element 78, said element having an internally screwthreaded cylindrical portion adapted to couple onto the correspondingly cylindrical externally threaded portion of the head 75.

The head 75 has at its end an inwardly extending flange 79. An annular cork gasket 80 is tightly clamped between the end wall of the flange 79 and a co-operating seat 81 in the support 78. The support 78 is further provided with an axial bore 82 which receives with a snug fit a reciprocable cylindrical nozzle 83. The nozzle 83 has a connector 84 screwthreaded at 85 onto the end of the nozzle 83, the connector being formed with axial recesses at either end. Within one of the recesses I position a ball 86 and spring 87, the spring pressing the ball against a valve seat 88. The other recess is in the form of a contact face having a flared guide portion 90 and a semi-spherical contact face proper 91. The two recesses are connected by a lubricant passage 92.

The nozzle 83 has a port 93 and a plunger guide portion 94 of reduced outside diameter beyond the said port, the guide portion being fitted with a washer 95.

A cylindrical member 98 has a longitudinally extending slot 99 and an open end screwthreaded at 100 into the support 78, the threaded end being disposed within the annular cork gasket 80 and clamping flange 79 therefor. The opposite end of the cylindrical member 98 has an inwardly extending flange 101 formed with an axial opening 102.

The plunger 96 has one end 97 projecting within the guide portion 94 and the other end formed with an outwardly flanged portion 103 whose end face 104 is of larger diameter than the opening 102 so that the plunger cannot pass therethrough but will contact with a seat 105 on the inner face of the flange 101. A spring 106 is provided between the washer 95 and the face 107 of the flange portion 103, said spring being normally compressed and serving to resiliently press the nozzle outwardly and the plunger inwardly toward the seat 105.

The nozzle has an annular cork gasket 108 which, when the nozzle is in the position shown in Figure 2, fits between an inclined seat 109 on the support 78 and the enclosing cup washer 110. The washer 110 is tightly fitted on the nozzle 83 which is broached as shown at 111 to maintain the washer 110 in position thereon and also to prevent the nozzle 83 from being projected outwardly beyond the position shown in Figure 2 by the effort of the spring 106. The gasket 108, when the parts are in the position illustrated in this figure, is tightly pressed between the washer 110 and the seat 109 on the support 78 and fits snugly to the outer wall of the nozzle 83 so that a leak-proof joint is maintained when the compressor is not in use to prevent lubricant from passing through the bore 82 of the support 78 and between the said support and the nozzle 83.

At 112 I show a knob handle and at 113 a rod extending therefrom to the interior of the compressor through the opening 65 in the cover cap 64. At its opposite end the rod 113 is of reduced diameter, as shown at 114, and the rod has an intermediate externally threaded portion 115 of a diameter less than the portion 113 and greater than the portion 114.

A cylindrical member 116 has at one end a flange 117 and laterally extending ports 118 adjacent thereto. The other end of the member 116 is threaded to receive a nut 119. The member 116 is snugly received within the cylindrical hollow rivet 74 of the composite piston 70—71 and is adapted to be reciprocated through the said hollow cylindrical rivet. A compression spring 120 of concavo-convex form has a central aperture of less diameter than the diameter of the nut 119 and is so formed as to be capable of being flattened against the washer 73 such as by providing it with inwardly extending radial slots or by curving it in a single direction only. The spring 120 normally maintains the ports 118 of the sliding valve, comprising such ports and the inner walls of the rivet 74, closed. This spring is overcome when the operator, desiring to withdraw the piston 70, pulls on the handle 112, thereby flattening the spring 120. The ports 118 will then be opened by being drawn into communication with the chamber behind the piston 70, that is, toward the handle end of the compressor, and air will flow through these ports and through the passageway in the interior of the member 116 and relieve the effect caused by the partial vacuum in front of the piston, that is, toward the nozzle end thereof.

A dished washer 121 embraces an annular cork gasket 122 and since the washer 121 seats against the shoulder on the underside of the flange 117 of the member 116, the gasket will be pressed into tight leak-proof contact with the washer 72 and the upper end of the rivet 74 so as normally to prevent air from being admitted to the chamber on the nozzle side of the piston 70, and this condition is maintained, moreover, when the compressor is being used to eject lubricant into a lubricant receiving bearing nipple, such as the nipple 124.

When the piston 70 is in a position more remote from the nozzle end of the compressor than that shown in the drawing, the end 125 of the rod 113 will not project, as illustrated in the drawing, beyond the inwardly extending flange 101 of the cylindrical member 98 but will be disposed to the rear thereof so that the plunger 96 will be retracted by its restoring spring 106 to that position wherein its rear face 104 is pressed against the inner face 105 of the flange 101 and at such time the foremost end of the plunger 96 will be to the rear of the port 93 in the nozzle 83, so that the longitudinal passageway in the nozzle 83 will communicate directly with the chamber within the compressor barrel and forwardly of the piston 70 and normally there would be no communication between the chambers in front of and to the rear of the piston 70, the ports 118 being maintained closed as shown.

When the compressor is first charged with lubricant, the piston 70 is positioned adjacent the cover 64 and lubricant is ejected from the compressor by placing the contact face 91 of the connector 84 against the end of the nipple 124, the compressor being held in the hand of the operator who grasps the handle 62—and then by pressing forward on the said handle 62 in the direction of the nipple 124, thereby establishing a manually maintained leakproof contact between the contact face 91 of the nozzle connector and the rim of the nipple. Additional pressure will then cause the nozzle 83 to be telescoped within the compressor and over the plunger 96 which, prior to such operation, had its end portion 97 disposed only within the guide extension 94 of the said nozzle 83. The telescoping of the nozzle toward the interior of the compressor barrel causes the port 93 to be closed by the plunger and the lubricant within the tubular nozzle 83 is forcibly displaced therefrom past the check valve 86 through the orifice 92 and through the orifice of the nipple 124 and thence to the bearing surfaces to be liubricated. In such operation the manual pressure supplied by the operator is operative to cause the nozzle 83 and plunger 96 to be telescoped and a charge of lubricant is thus ejected under high pressure into the nipple.

When the operator releases the pressure, the spring 106 will force the nozzle 83 back to its normal position. During this operation of restoring the nozzle to its normal position, the plunger 96 is maintained stationary with respect to the barrel of the compressor and has its rear face pressed into engagement with the face 105 of the flange 101. As soon as the nozzle 83 has advanced sufficiently relatively to the barrel so that the port 93 is reopened, the space in the nozzle previously occupied by the ejected lubricant will now contain no lubricant and a considerable degree of vacuum will exist therein. This will create a negative pressure which, when the port 93 is re-opened, will draw a fresh charge of lubricant from the compressor barrel into the interior of the tubular nozzle 83. When the lubricant from the compressor barrel is thus caused to flow through the slot 99 in the tube 98 and thence through the port 93 into the nozzle 83, the piston 70 will be drawn forwardly within the barrel 61 toward the nozzle end of the compressor, the negative pressure being communicated to the piston to cause it so to move. This will draw the handle 112 inwardly and the position of this handle will serve as an indication to the operator as to the amount of lubricant still remaining within the compressor and capable of being discharged therefrom. This action will continue upon successive operations of the compressor to charge lubricant receptacles such as the nipple 124, and each time the movable wall or piston 70 will be advanced until the end 125 of the rod 114 will press against the face 104 of the plunger 96 finally to a degree where the port 93 will remain closed and at such time no new lubricant will flow into the nozzle 83 by virtue of negative pressure incidental to previous operations of the compressor, and a subsequent attempt to operate the compressor will reveal to the operator that the nozzle 83 will telescope very easily and with much less resistance than heretofore and he will then know that the compressor barrel needs recharging with lubricant.

By the provision of this structure wherein the port 93 is closed when the lubricant has been discharged from the barrel to a predetermined degree, air is prevented from being drawn into the nozzle 83 by the negative pressure set up within the nozzle after a discharge of lubricant therefrom whenever the supply of lubricant for replenishing the nozzle is inadequate.

My improved compressor, therefore, prevents air from entering the nozzle when the lubricant is nearly discharged from the compressor and maintains the nozzle full of lubricant at all times so that it is only necessary when recharging the compressor to recharge the barrel, the nozzle remaining charged.

The compressor barrel is readily recharged by withdrawing the cover 64 by pulling thereon thus causing the circular spring 67 to expand and be forced over the enlarged curved end of the barrel 61, as shown at 68, and by retracting the handle 112 relative to the barrel 61 thus pulling the piston 70 out of the barrel. This can be accomplished without interference or resistance caused by the negative pressure, since the first movement of the handle produces a movement of the sliding valve member 116 to open the ports 118 and place them in communication with the air space to the rear of the piston 70, whereby air from such space may flow through the ports 118 and through the interior of the member 116 to the space in front of the piston, thus relieving the negative pressure previously set up and which would tend to resist the removal of the piston 70. Parts 112 and 113 are also useful in filling the compressor for the first time and whenever the high pressure ejecting means 83 and 96 may become air bound by reason of a leaky valve or may require priming for any reason whatsoever. To do this, a forward thrust on the head 112 may be resisted by holding the handle 62 or the barrel 61, or in any other way than by a counter thrust on the nozzle 83. When operated in this manner sufficient pressure may easily be exerted to expell the gaseous contents of the nozzle 83 past the check valve 86 and fill said nozzle with a fresh charge of lubricant.

The nozzle 83, connector 84, plunger 96, together with the spring 106 and the other parts directly associated therewith, can be removed as a unit from the front of the head 75 by simply unscrewing the support 78 which carries the nozzle, the tube 98 and other associated parts. This is of considerable advantage in assembling the compressor when it is first manufactured or when it is desired to inspect or clean the interior thereof.

This feature also permits of substituting a different kind of nozzle, such as the nozzle and support 130 therefor shown in Figures 3 and 4 of the drawing. This modified form of nozzle is provided with internal threads 131 which can be screwed into engagement with the externally threaded portion of the head 75. The support 130 may carry a nozzle 132 adapted for insertion into a lubricant receiving aperture such as the apertures provided by universal joints for automobiles, transmission gear cases therefor, and the like and which lubricant receiving parts are adapted to receive lubricant at low pressure. In such a case the pressure for ejecting lubricant from the nozzle 132 will be supplied by pressing the handle 112 forwardly, thus forcing the piston 70 forward by manual pressure directly applied thereto. Such manner of operation will permit the valve ports 118 to remain closed and the lubricant can thus be directly ejected without the provision of a high pressure plunger and cylinder, such as the plunger 96 and the nozzle cylinder 83.

The above described construction also permits me to remove the parts removable as a unit and described herein as carried on the support 78 and to attach the head 75 to a source of lubricant such as a tank wherein lubricant is maintained under pressure for the purpose of reloading the compressor after the supply of lubricant has been depleted therein. In such a case the piston 70 will be in a forward position within the barrel 61 and towards the head 75 and lubricant being forced into the lubricant reservoir will force the piston 70 rearwardly, air escaping through the opening 55 in the cover 64 as the reservoir is thus refilled. The self-contained unit carried on the support 78 is thereafter replaced by screwing it onto the head 75.

Having thus described the operation of several embodiments of my invention, I wish to point out particularly that I have herein provided a lubricant dispensing device comprising a lubricant reservoir having a movable wall, one side of which is maintained substantially at atmospheric pressure by virture of the opening 55 and a discharge conduit leading from the reservoir on the other side of the wall, together with means to displace the lubricant from such conduit and subsequently to close the discharge end of such conduit prior to the withdrawal of the lubricant displacing means, which, in the embodiments illustrated, comprises a plunger, such operation resulting in a considerable reduction of fluid pressure within the said conduit and which reduced pressure is distributed to all portions of the reservoir whereby a difference of pressure will be exerted on the two sides of the movable wall, the movable wall therefore being pressed toward the discharge conduit by the excess of atmospheric pressure on that side which communicates with the atmosphere.

Having thus described a preferred embodiment of my invention, I wish it to be understood that I am aware that numerous and extensive departures may be made from the embodiment herein illustrated and described without departing from the spirit of my invention or from the scope of the protection afforded by the claims thereto.

What I claim is:

1. A portable grease compressor comprising a lubricant receptacle and a nozzle connected for relative reciprocation, a plunger adapted to be telescoped within the nozzle for forcibly ejecting a contained charge of lubricant therefrom when said receptacle and nozzle are reciprocated, an annular lubricant leak-proof gasket fitted between the outer surface of the nozzle and the adjacent wall of the receptacle, and resilient restoring means for said nozzle and plunger, said gasket receiving the force of said restoring means when the device is not in use, to maintain a tight seal.

2. A lubricant compressor comprising a reservoir, high pressure means for withdrawing and ejecting lubricant therefrom, a movable wall in said reservoir, said wall being moved toward the outlet of the reservoir solely by atmospheric pressure, means for withdrawing said wall from the reservoir, and means automatically acting upon movement of the first named means in withdrawing the wall from the reservoir for creating balanced pressures on both sides of said wall.

3. A lubricant compressor comprising a reservoir, a movable wall therefor, the outer side of said wall being subject to atmospheric pressure only, means for withdrawing and ejecting, independently of said wall, lubricant on the inner side of said wall, said wall being moved responsive to the pressure of the atmosphere on its outer side to deliver a new charge of lubricant to said ejecting means, a handle for withdrawing said wall from said reservoir, and means automatically operated by said handle for admitting atmospheric pressure to the inner side of said wall.

4. Lubricating means comprising a barrel, a piston slidable therein, a rod for actuating said piston, valve means opening a passage past the piston and actuated by relative movement between said piston and said rod, and a connection between said rod and piston having resilient lost motion to permit actuation of said valve by the operator.

5. A lubricant compressor comprising a barrel, a discharge tube telescopically mounted in one end of said barrel, a stationary plunger in said barrel to telescope with said discharge tube and express the contents thereof, a coil spring encircling said plunger substantially throughout its length and resiliently pressing said discharge tube outwardly, a stationary housing tube in said barrel housing said plunger, said spring and said discharge tube when said discharge tube is pushed in, said housing tube having a lateral inlet orifice, and an abutment in the end of said housing tube for holding said plunger stationary and receiving the thrust of said spring.

6. A lubricant compressor of the class described comprising, in combination, a reservoir a cylinder supplied from said reservoir, means for discharging lubricant from said cylinder at high pressure a suction actuated follower in said reservoir, movable means associated with said follower for permitting passage of air thereby, a spring for holding said movable means in one position, and retracting means connected to said movable means, said retracting means for withdrawing said follower and shifting said movable means to permit passage of air past said follower during the retraction thereof.

In testimony whereof I hereunto affix my signature this 3d day of July, 1923.

OSCAR ZERK.